United States Patent
Wong et al.

(10) Patent No.: US 10,990,198 B2
(45) Date of Patent: Apr. 27, 2021

(54) WIRELESS STYLUS WITH GRIP FORCE EXPRESSION CAPABILITY

(71) Applicant: INTEL CORPORATION, Santa Clara, CA (US)

(72) Inventors: Hong W. Wong, Portland, OR (US); Jiancheng Tao, Shanghai (CN); Xiaoguo Liang, Shanghai (CN); Wah Yiu Kwong, Beaverton, OR (US); Cheong W. Wong, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 56 days.

(21) Appl. No.: 16/305,866

(22) PCT Filed: Jun. 30, 2016

(86) PCT No.: PCT/CN2016/087903
§ 371 (c)(1),
(2) Date: Nov. 29, 2018

(87) PCT Pub. No.: WO2018/000333
PCT Pub. Date: Jan. 4, 2018

(65) Prior Publication Data
US 2019/0212837 A1 Jul. 11, 2019

(51) Int. Cl.
*G06F 3/0354* (2013.01)
*G06F 3/038* (2013.01)
(Continued)

(52) U.S. Cl.
CPC ........ *G06F 3/03545* (2013.01); *G06F 1/1698* (2013.01); *G06F 3/0383* (2013.01);
(Continued)

(58) Field of Classification Search
CPC ............ G06F 3/03545; G06F 3/03547; G06F 3/04883; G06F 3/0383; G06F 3/045; G06F 3/0414; G06F 3/0412; G06F 1/1698
See application file for complete search history.

(56) References Cited

U.S. PATENT DOCUMENTS

| | | |
|---|---|---|
| 2,582,939 A | 1/1952 | Frederick |
| 5,277,785 A | 1/1994 | Van Anglen |
| | (Continued) | |

FOREIGN PATENT DOCUMENTS

| | | |
|---|---|---|
| CN | 101872259 A | 10/2010 |
| CN | 101872260 A | 10/2010 |
| CN | 105487790 A | 4/2016 |

OTHER PUBLICATIONS

State IP Office of the PR China—International Search Report of the International Searching Authority for International Application No. PCT/CN2016/087903 dated Mar. 23, 2017, 4 pgs.
(Continued)

*Primary Examiner* — Ryan A Lubit
(74) *Attorney, Agent, or Firm* — Hanley, Flight & Zimmerman, LLC (57) ABSTRACT

Embodiments are generally directed to a wireless stylus with force expression capability. An embodiment of an apparatus includes a body; a microcontroller; a force sensor to detect a pressure applied against the body of the apparatus; one or more motion sensors; and a wireless transmitter and antenna, the microcontroller to transmit force data from the force sensor and motion data from the one or more motion sensors via the wireless transmitter and antenna.

20 Claims, 7 Drawing Sheets

(51) Int. Cl.
  *G06F 3/041* (2006.01)
  *G06F 3/045* (2006.01)
  *G06F 3/0488* (2013.01)
  *G06F 1/16* (2006.01)

(52) U.S. Cl.
  CPC .......... *G06F 3/03547* (2013.01); *G06F 3/045* (2013.01); *G06F 3/0412* (2013.01); *G06F 3/0414* (2013.01); *G06F 3/04883* (2013.01)

(56) References Cited

U.S. PATENT DOCUMENTS

| | | | |
|---|---|---|---|
| 5,420,607 A | 5/1995 | Miller et al. | |
| 5,546,624 A | 8/1996 | Bock | |
| 5,825,350 A | 10/1998 | Case et al. | |
| 6,226,000 B1 | 5/2001 | Richens et al. | |
| 6,595,219 B2 | 7/2003 | Anderson | |
| 10,338,701 B2 | 7/2019 | Parikh et al. | |
| 10,642,376 B2 | 5/2020 | Trethewey et al. | |
| 2003/0076310 A1* | 4/2003 | Kanzaki | G06F 3/03545 345/179 |
| 2003/0117408 A1 | 6/2003 | Forsline et al. | |
| 2005/0116940 A1 | 6/2005 | Dawson | |
| 2007/0079030 A1 | 4/2007 | Okuley et al. | |
| 2007/0139392 A1 | 6/2007 | Kim | |
| 2007/0279875 A1 | 12/2007 | Bell et al. | |
| 2008/0066000 A1 | 3/2008 | Ofek et al. | |
| 2008/0084189 A1 | 4/2008 | Kim | |
| 2008/0303646 A1 | 12/2008 | Elwell et al. | |
| 2009/0091396 A1 | 4/2009 | Jian et al. | |
| 2009/0135164 A1 | 5/2009 | Kyung et al. | |
| 2010/0079602 A1 | 4/2010 | Napper et al. | |
| 2010/0318710 A1 | 12/2010 | Downing et al. | |
| 2011/0090726 A1 | 4/2011 | Brotto et al. | |
| 2011/0164000 A1* | 7/2011 | Pance | G06F 3/038 345/179 |
| 2011/0279081 A1 | 11/2011 | Cacioppo et al. | |
| 2012/0081299 A1 | 4/2012 | Xiao et al. | |
| 2012/0153026 A1 | 6/2012 | Bohn et al. | |
| 2012/0171657 A1 | 7/2012 | Ortins et al. | |
| 2012/0206330 A1 | 8/2012 | Cao et al. | |
| 2012/0331546 A1 | 12/2012 | Falkenburg et al. | |
| 2013/0044057 A1 | 2/2013 | Saito | |
| 2013/0201162 A1 | 8/2013 | Cavilia | |
| 2013/0229390 A1 | 9/2013 | DiVerdi | |
| 2013/0249823 A1* | 9/2013 | Ahn | G06F 3/03545 345/173 |
| 2014/0035883 A1 | 2/2014 | Mercea et al. | |
| 2014/0043245 A1 | 2/2014 | Dowd et al. | |
| 2014/0051940 A1 | 2/2014 | Messerschmidt | |
| 2014/0071147 A1 | 3/2014 | Trethewey et al. | |
| 2014/0075178 A1 | 3/2014 | Trethewey | |
| 2014/0098033 A1 | 4/2014 | Simmons | |
| 2014/0108927 A1 | 4/2014 | Vaidya et al. | |
| 2014/0146021 A1 | 5/2014 | Trethewey et al. | |
| 2014/0149062 A1 | 5/2014 | Chandrasekaran et al. | |
| 2014/0340318 A1 | 11/2014 | Stringer | |
| 2015/0248793 A1 | 9/2015 | Abovitz et al. | |
| 2015/0346825 A1 | 12/2015 | Chiu et al. | |
| 2016/0026253 A1 | 1/2016 | Bradski et al. | |
| 2016/0154484 A1* | 6/2016 | Kampf | G06F 3/03545 345/179 |
| 2017/0003767 A1* | 1/2017 | Holsen | G06F 3/0446 |
| 2017/0046041 A1 | 2/2017 | Lee et al. | |
| 2017/0100223 A1 | 4/2017 | Silverberg | |
| 2017/0315631 A1 | 11/2017 | Pourbigharaz | G06F 3/0383 |
| 2017/0344137 A1* | 11/2017 | Noguchi | G06K 9/00416 |
| 2018/0046268 A1 | 2/2018 | Keidar et al. | |
| 2019/0025949 A1 | 1/2019 | Parikh et al. | |

OTHER PUBLICATIONS

State IP Office of the PR China—Written Opinion of the International Searching Authority for International Application No. PCT/CN2016/087903 dated Mar. 23, 2017, 3 pgs.
International Search Report and Written Opinion received for PCT Patent Application No. PCT/CN2016/087903, dated Mar. 23, 2017, 6 pages.
International Preliminary Report on Patentability received for PCT Patent Application No. PCT/CN2016/087903, dated Jan. 10, 2019, 5 pages.
Rigg, Jamie, "Sony Tries to Patent Stylus with Friction-Based Haptic Feedback," Nov. 22, 2012, available at https://www.engadget.com/2012-11-22-sony-haptic-feedback-stylus-patent, 7 pages.
Gyration, "Motion-Sensing Technology," available at http://www.gyration.com/pages/gyration-technology (last accessed Dec. 7, 2012), 2 pages.
N-Trig, "DuoSense Pen," available at http://www.ntrig.com/Content.aspx?Page=DigitalPencil (last accessed Dec. 7, 2012), 3 pages.
Wacom, "Bamboo Stylus," available at http://www.wacom.com/products/stylus (last accessed Dec. 7, 2012), 3 pages.

* cited by examiner

WIRELESS STYLUS WITH GRIP FORCE EXPRESSION CAPABILITY

CROSS-REFERENCE TO RELATED APPLICATIONS

This patent application is a U.S. National Phase application under 35 U.S.C. § 371 of International Application No. PCT/CN2016/087903, filed Jun. 30, 2016, entitled "WIRELESS STYLUS WITH FORCE EXPRESSION CAPABILITY", the contents of which are incorporated herein by reference.

TECHNICAL FIELD

Embodiments described herein generally relate to the field of electronic devices and, more particularly, a wireless stylus with force expression capability.

BACKGROUND

Operation of computing systems and related devices may include multiple input devices, including stylus devices that may be utilized to write or draw on a touch sensitive surface to provide an input to the system or device. The use of the stylus allows a user experience that is similar to writing or drawing on paper or other traditional surface.

However, in circumstances in which a system or device is used for writing or drawing through space in a gesture recognition system, the user experience is significantly changed because of the lack of a solid surface to write or draw on. While a conventional system may be able to follow the stylus or other device in three dimensional space, there is no surface to provide force against. As such, conventional systems generally do not provide a natural writing or drawing experience for a user.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Embodiments described herein are generally directed to a wireless stylus with force expression capability.

For the purposes of this description:

"Stylus" refers to a handheld apparatus for providing writing or drawing gestures through space, on a touch sensitive surface, or both. The term "stylus" may include, but is not limited to, an apparatus that is shaped like a pen or other traditional writing or drawing instrument. The term stylus may also include a non-traditional shaped instrument that is used for writing or drawing gestures.

"Grip" refers to a portion of a handheld apparatus, including a stylus, that is intended for placement of a user's fingers to grip or hold the apparatus when in use.

Certain existing technology allows for gesture recognition in conjunction with a computing device. Using conventional technology, it is possible to write in the air by using an IR (infrared) sensing camera or other imaging system. For example, technology provided by Leap Motion may be utilized with a computing system. Further, another conventional option for writing or drawing in space is the use of "smart rings" or other items to provide for tracking of motion using a motion sensor. Such technologies may be used in certain context for writing or drawing symbols or shapes in applications.

However, such conventional technologies do not allow for natural variation in the thickness or darkness of a line during writing or drawing. Stated in another way, conventional systems may allow for translation of motion into a line on a screen, but such technologies do not provide any means of adding anything to the line during the writing or drawing process.

In some embodiments, a handheld apparatus, including a wireless stylus, provides force expression capability to provide a more natural writing or drawing experience when providing writing or drawing gestures through space. In some embodiments, force sensing by the apparatus allows a user to provide a force expression that is similar to providing more or less force on a writing surface to vary a characteristic, such as to provide a thicker or darker line, or a thinner or lighter line, on a display screen in response to the application of a greater pressure, or a lesser pressure, on the stylus.

In some embodiments, a same stylus that is used for writing or drawing on the touchscreen of a tablet computer or other apparatus is a universal stylus also operable to write or draw on a projected image or other display by performing a gesture through space (which may also be referred to writing or drawing in the air. In some embodiments, the stylus includes capability of communicating a force component in the writing or drawing gesture through space. In some embodiments, the stylus enables a user to apply a pressure to the stylus to express a pressure component concurrently with the expression of a writing or drawing gesture through space.

In an example, a user who is providing a presenting to a group, such as a teacher or instructor presenting to a classroom of students or a team member presenting to others in a work group, may utilize an embodiment of a stylus to write or draw through space, while currently providing a force component to express a line with a varying characteristic in order to provide a certain expression. The expression that is provided by the varying of a characteristic may include, but is not limited to, a wider or darker line for emphasis, to provide a varying line in an artistic expression, or other type of expression.

In some embodiments, a stylus includes a force sensor to sense an amount of pressure applied to the stylus, where the apparatus or system is to interpret the amount of pressure applied to the stylus as a force expression in connection with a writing or drawing gesture through space. In some embodiments, a stylus includes the force sensor in a location that allows the user to vary the force applied to the stylus concurrently with the expression of a writing or drawing expression through space. In some embodiments, the force sensor surrounds a portion of a body of the stylus, or, stated in another way, the force sensor is located along a circumference of the body of the stylus, to allow application of force to a surface of the stylus when the stylus is used in operation. In some embodiments, a stylus further includes a grip, the force sensor being located to sense pressure applied on the grip of the stylus, thus providing user access to the force sensor when the stylus is held in a natural position for a writing or drawing gesture. In one example, the grip may include a rubberized shell portion of the stylus for gripping the stylus with the fingertips or other portion of the fingers of the user. In some embodiments, a user may vary the application of pressure on the rubberized shell to vary the force component applied when writing or drawing through space.

In some embodiments, an apparatus or system may provide a beginning or end of stroke gesture in response to application of force on the force sensor of a stylus. In some embodiments, a force that is below a certain threshold may be interpreted as a motion in which the stylus is not engaged in writing or drawing, but is rather in motion without writing or drawing operation, which may be referred to a "Pen Up" (or Stylus Up") mode. In some embodiments, a force that is equal to or above the threshold may be interpreted as a motion in which the stylus is engaged in writing or drawing, which may be referred to as a "Pen Down" (or "Stylus Down") mode. For example, a user may move to a location to begin a stroke in the Pen Up mode; apply a greater pressure at least equal to the threshold to transition to the Pen Down mode, thereby providing a beginning of stroke signal; write or draw a stroke, wherein a width or darkness of the stroke is established by varying pressure on the force sensor; and release pressure on the force sensor to transition to the Pen Up mode, thereby providing an end of stroke signal. In this manner, an apparatus or system provides a natural writing or drawing experience for a user when providing a gesture through space.

Figure 1:
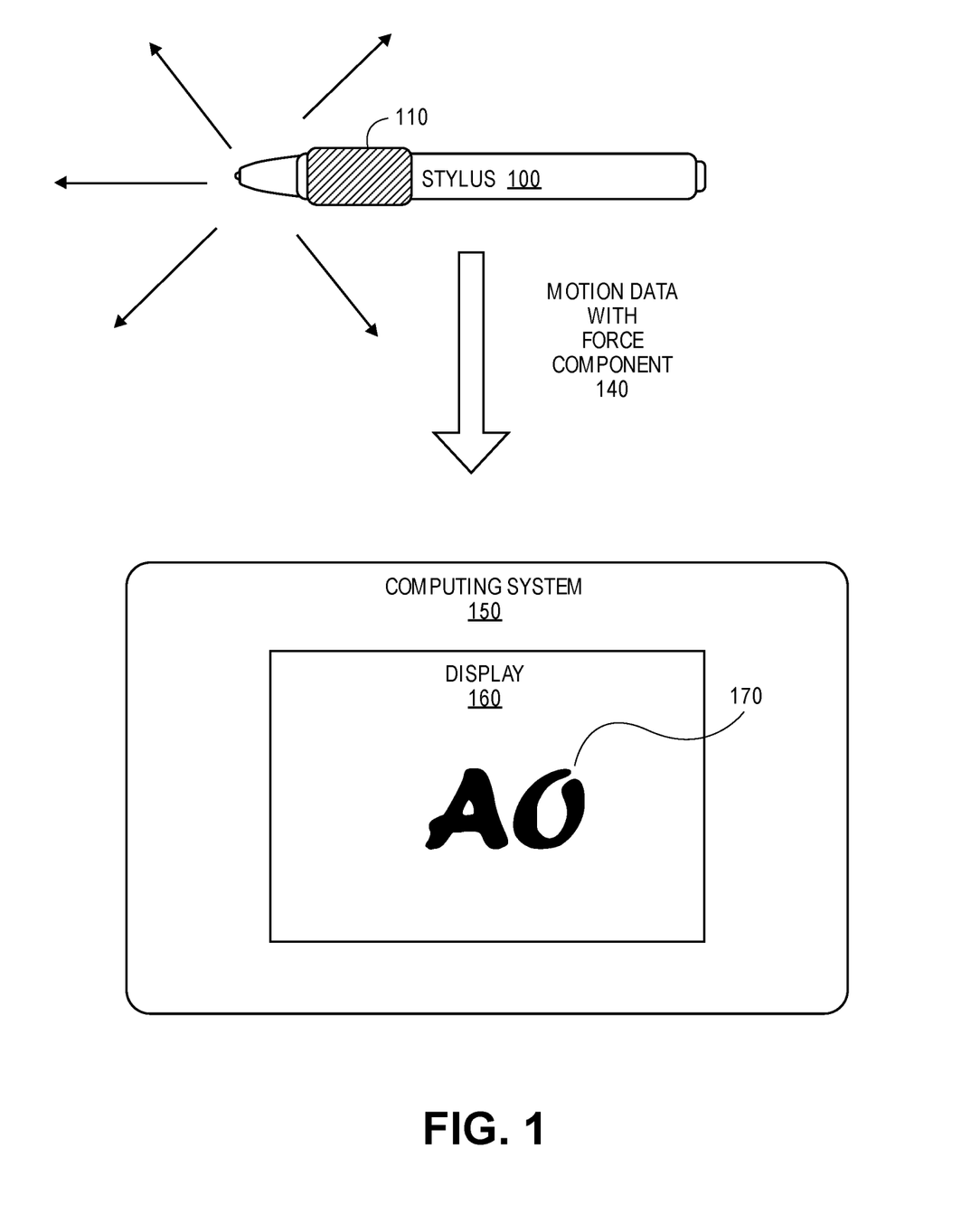
FIG. 1 is an illustration of system including a force sensing apparatus according to an embodiment.

FIG. 1 is an illustration of system including a force sensing apparatus according to an embodiment. In some embodiments, a force sensing stylus 100 includes a force sensor to generate force data in response to pressure applied to the stylus, such a force sensor located to sense pressure applied to a body of the stylus. In some embodiments, the stylus further includes a grip 110, the grip coving the force sensor at least in part. In some embodiments, the stylus 100 is to generate force data in response to pressure applied to the grip 110 of the stylus.

In some embodiments, the stylus 100 is to transmit motion data including a force data component 140 to a linked system to present a display of writing or drawing by the stylus through space. Motion data may also be referred to as gesture data. In some embodiments, the force component of the data represents the pressure applied to the stylus 100 by a user.

In some embodiments, the stylus provides the motion data 140 to a computing system or apparatus 150 including a display 160 for interpretation and display of the motion data. In addition a physical display screen, the display 160 may include a projected display onto a screen or other surface.

In some embodiments, the application of pressure on the stylus 100 is to provide a force input concurrently with a stroke that is written or drawn by the user through space. In some embodiments, the computing system 150 may detect the motion data 140 that is generated by the stylus, interpret the data, and present an image on the display 160 that varies in response to the amount of force that is applied to the stylus 100. For example, a width or darkness of a particular stroke 170 may vary with the application of pressure on the stylus 100, thus allowing for a change in the display of a stroke in real time as the image is generated. In some embodiments, the computing system 150 may further detect the beginning and end of a stroke based on an amount of force applied to the stylus, with an amount of force below a threshold being interpreted as a Pen Up mode (not writing or drawing) and a force equal to or above the threshold being interpreted as a Pen Down mode.

Figure 2A:
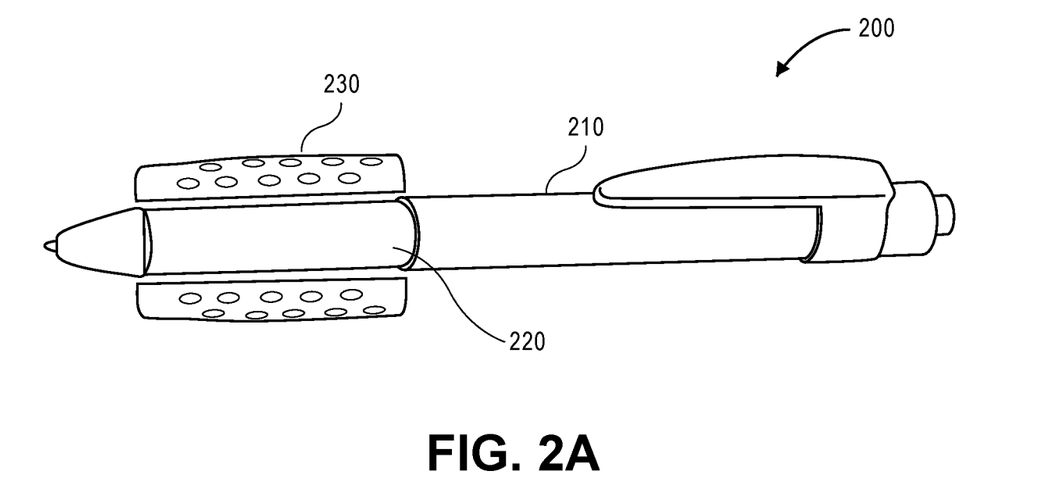
FIGS. 2A and 2B are illustrations of a force sensing apparatus according to an embodiment.
Figure 2B:
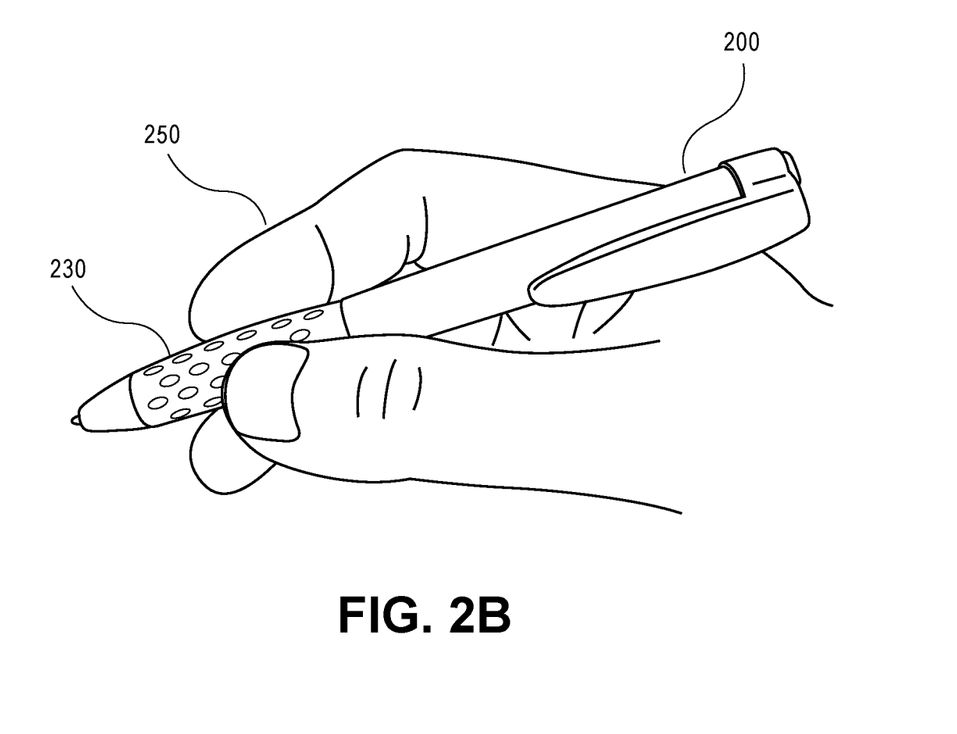

FIGS. 2A and 2B are illustrations of a force sensing apparatus according to an embodiment. In some embodiments, the stylus 200 includes a body 210 (which may include, but is not limited to, a pen- or pencil-like cylinder shape) and a force sensor 220 to detect force applied to the body 210 of the stylus 200 by a user to express a force component of a writing or drawing gesture. In some embodiments, the force sensor 220 surrounds a portion of the body 210 of the stylus. In some embodiments, the force sensor 220 is located along a circumference of the body 210 of the stylus 200.

In some embodiments, the stylus further includes a grip 230, where the grip at least in part covers or encloses the force sensor 220, the force sensor 220 to detect force applied to the grip 230 by a user to express a force component of a writing or drawing gesture.

In the example, illustrated in FIG. 1, the force sensor 220, grip 230, or both of the stylus 200 is located in a region of the stylus 200 where the fingers 250 of the user will naturally grasp or grip the stylus for a writing or drawing gesture. In an embodiment of a stylus 200 including a grip 230, the grip provides a dual purpose of holding the stylus and providing access to the force sensor for force expression by a user.

In some embodiments, the stylus 200 is linked with an apparatus or system that includes a display, such as the display 160 of computing system 150 illustrated in FIG. 1, to present the writing or drawing gestures performed by the user. In some embodiments, strokes generated by the stylus include a characteristic, such as a width or darkness of a stroke that varies with the application of force on the force sensor 220 or via the grip 230.

In some embodiments, the surface of the grip 230 covering or encompassing the force sensor at least in part is encapsulated with a material (with an example being a conductive rubberized enclosure) and enable the charge of the body to create sufficient capacitance and allow the same pen be used for writing on the regular tablet using capacitive touch technology.

Figure 3:
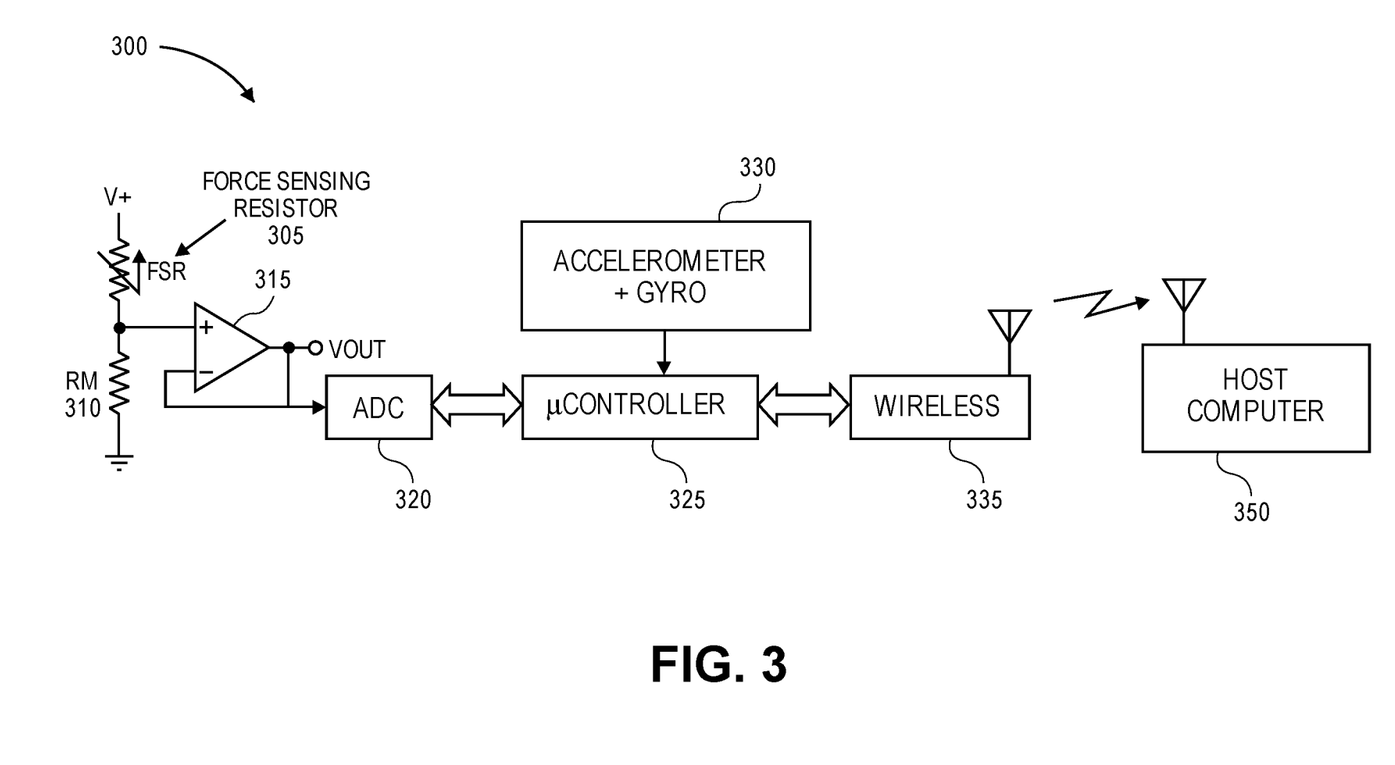
FIG. 3 is an illustration of components of a force sensing universal stylus according to an embodiment.

FIG. 3 is an illustration of components of a force sensing stylus according to an embodiment. In some embodiments, a stylus 300 includes a force sensing resistor 305 to detect pressure applied to the stylus 300. As illustrated the force sensing resistor 305, illustrated as having a first terminal coupled with a voltage V+ and a second terminal coupled with a second resistance, RM 310, and with an amplifier element to generate a voltage signal that is provided to an analog to digital converter, ADC 320, to generate force data for a microcontroller 325.

In some embodiments, the stylus 300 further includes one or more other sensors to sense movement of the stylus for writing or drawing operation. For example, the one more movement sensors may include one or more of an accelerometer (to measure proper acceleration or g-force) and a gyro sensor 330 (to sense angular velocity, also referred to as an angular velocity sensor), which are also coupled with microcontroller 325. In some embodiments, the force/pressure sensor data for a stylus, together with the movement data generated by one or more of the accelerometer and gyro sensor 330 are directed by the microcontroller 325 to a wireless transmitter (wherein a transmitter may be a portion of a transceiver) 335 for transmission to a host computer 350.

It is noted that a high amount of latency in the operation of a stylus would be unacceptable as a significant lag between the motion and the system presentation of the movement and force data in the form of a displayed line or shape would defeat the purpose of natural writing or drawing motion, resulting in a very poor user experience in operation. In some embodiments, the force and movement data is transmitted to the to the host device 350 using a low latency wireless link to allow for natural operation by a user operating the stylus. The total writing latency can be within a normal range of 65-100 mSec (microseconds) that is provided by most touch enabled devices, such as a 2 in 1 or detachable computer, Ultrabook or other laptop or notebook computer, tablet computer, or smartphone.

It is noted the common Bluetooth link provides a reasonable latency in operation, and will generally provide acceptable performance in writing or drawing operation. However, technologies may be applied that reduce latency times further. In an example, the Ulolat (Ultra-Low Latency Wireless Connectivity) technology of Qualcomm Inc. is intended to provide end to end latency of approximately 1 mSec for intra and inter machine communications in the 2.4 GHz. (gigahertz) or 5 GHz. bands.

Figure 4:
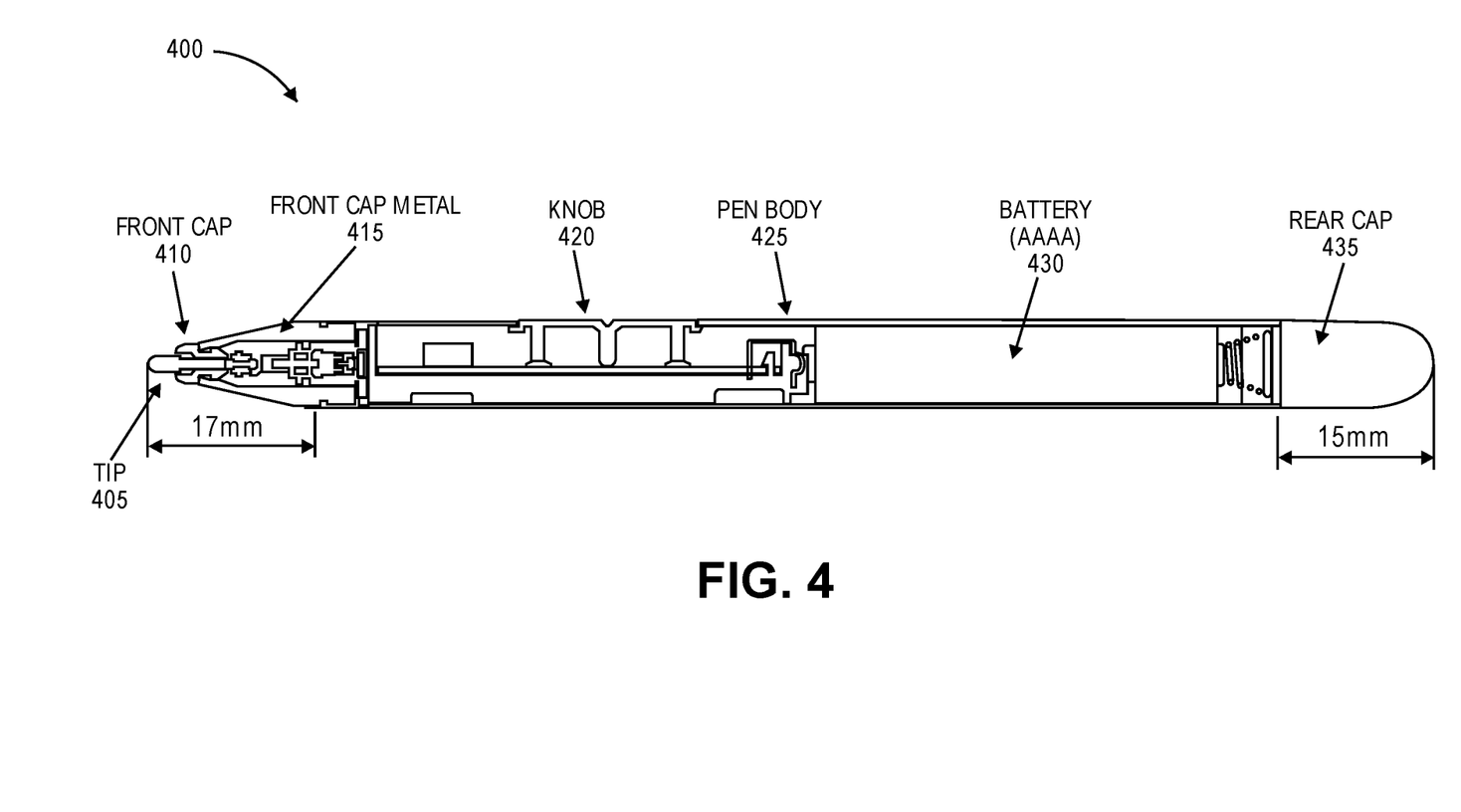
FIG. 4 is an illustration of a stylus with force sensing capability according to an embodiment.

FIG. 4 is an illustration of a stylus with force sensing capability according to an embodiment. In some embodiments, an operational universal stylus with force sensing capability may include, but is not limited to:

A body 425, which may include, but is not limited to, a pen- or pencil-shaped body.

A stylus tip 405 for use as a touchscreen stylus in addition to operation for writing or drawing in space. In some embodiments, the stylus tip 405 may be retractable to, for example, allow extension of the tip when the stylus is in use with a touchscreen and retraction of the tip when the stylus is in use for writing or drawing through space.

A front cap 410 to stabilize the tip 405, and a metal cap or sleeve 415 to couple the front cap and tip 405 to the body 425 of the stylus 400.

A knob 420 to provide control function including, for example, to turn on the electronics of the stylus 400 for motion and force sensing. In some embodiments, the stylus may turn off the electronics or transition the electronics to a standby state after a period without movement to conserve power.

A battery 430 to power the stylus, where the battery may be rechargeable or non-rechargeable battery. One example may be an AAAA size battery, which has a size and shape that will fit within a pen-shaped stylus body 425.

An end cap 435 to provide access to the battery 430 and possibly other components. Further, the end cap may in some instance be used to retract or extend the stylus tip 405.

Figure 5:
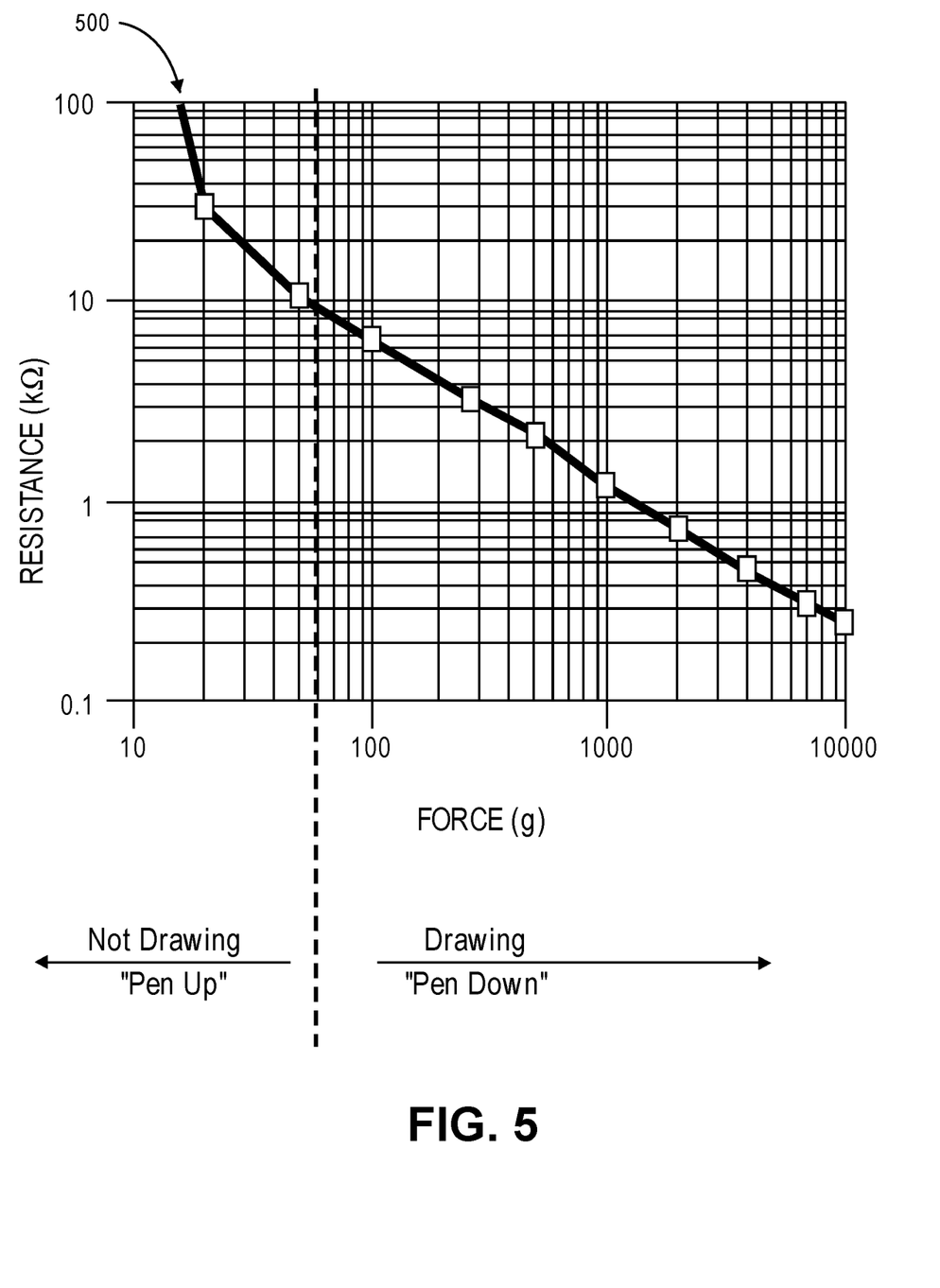
FIG. 5 is an illustration of interpretation of force data from a force sensing stylus according to an embodiment.

FIG. 5 is an illustration of interpretation of force data from a force sensing stylus according to an embodiment. In the illustrated graph, a resistance (in kilo-ohms, kΩ) provided by a certain force sensing resistor with the application of a certain form (expressed in grams, g).

In some embodiments, a force below a certain threshold force level, such as roughly 60 grams in FIG. 5, is to interpreted as not writing or drawing, or a "Pen Up" (or "Stylus Up") state; and a force equal to or above the threshold as writing or drawing, or a "Pen Down" (or "Stylus Down") state. In this manner, a user may move the stylus through space to a location for beginning a stroke, apply sufficient force to commence the stroke, and then release the pressure to end the stroke. Further, the user may modify a characteristic (such as width or darkness) of a line by modulating the amount of pressure applied to the force sensing resistor during the stroke.

In some embodiments, a stylus may further include a time limit for changes to the Pen Up and Pen Down states to reduce the likelihood that a momentary increase or decrease in pressure will cause the drawing of an unintended line, or create an unintended gap in a line.

In some embodiments, the force threshold may have a set or initial value. In some embodiments, the threshold may have an adjustable value for a particular user, which may be modified as needed based on the strength of the user and other factors.

Figure 6:
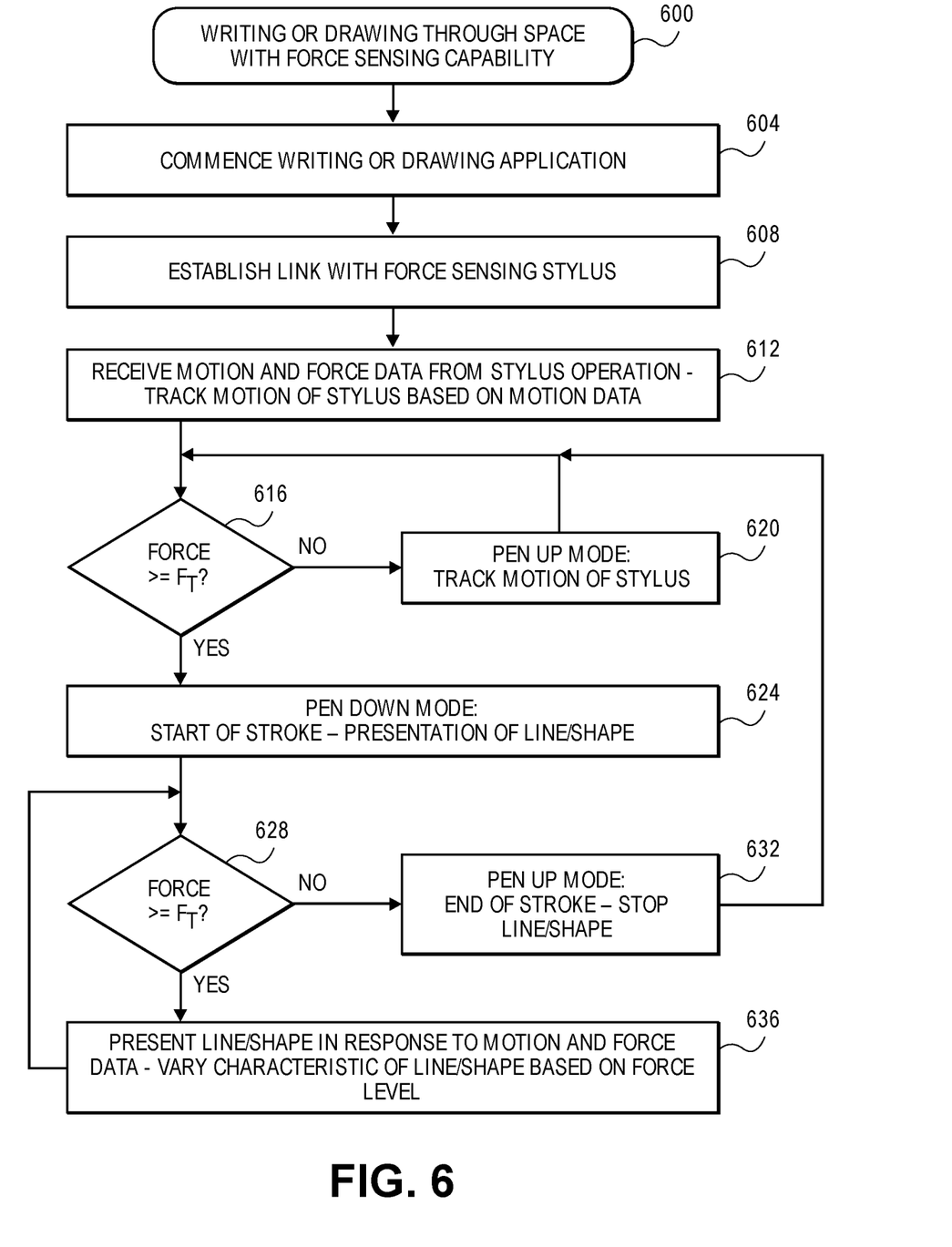
FIG. 6 is a flowchart to illustrate a process for enabling writing or drawing through space with force sensing capability according to an embodiment.

FIG. 6 is a flowchart to illustrate a process for enabling writing or drawing through space with force sensing capability according to an embodiment. In some embodiments, a process 600 includes commencing a writing or drawing operation 604, and establishing a wireless link with a force sensing stylus 608. In some embodiments, the operations are provided by a computing system, such as the computing system 150 illustrated in FIG. 1. In some embodiments, the process continues with the reception of motion and force data from the operation of the stylus 612, with operation including tracking motion of the stylus based on the motion data. In some embodiments, the operation includes the presentation of writing or drawing from the stylus on a display, such as the display 160 illustrated in FIG. 1.

In some embodiments, if the force data received from the stylus is greater than or equal to (or simply greater than) a certain force threshold ($F_T$) 616, then the operation is to transition to a Pen Down mode, indicating a start of a stroke through space and presentation of a line or shape that is written or drawn by the stylus 624. In some embodiments, the transition is not to occur unless the force remains equal to or greater than the threshold for at least a certain minimum length of time. If the force data received from the stylus is less than (or less than or equal to) the force threshold $F_T$ 616, then the operation is to transition to (or remain in) a Pen Up mode and continue tracking motion of the stylus 620 as the stylus moves through space. In some embodiments, the initial or default mode for a system is the Pen Up mode.

Upon commencing the Pen Down mode, if the force level remains greater than or equal to the force threshold $F_T$ 628, then the system is to present the line or shape written or drawn by the movement of the stylus in response to the motion and force data, with a characteristic (such as width or darkness) of the line or shape to vary based at least in part on the force level indicated by the force data 636. If the force level drops below the force threshold $F_T$ 628, then the system is to transition back to the Pen Up mode resulting in an end of the current stroke and the end of the displayed line or shape 632. In some embodiments, the transition is not to occur unless the force remains below the threshold for at least a certain minimum length of time.

Figure 7:
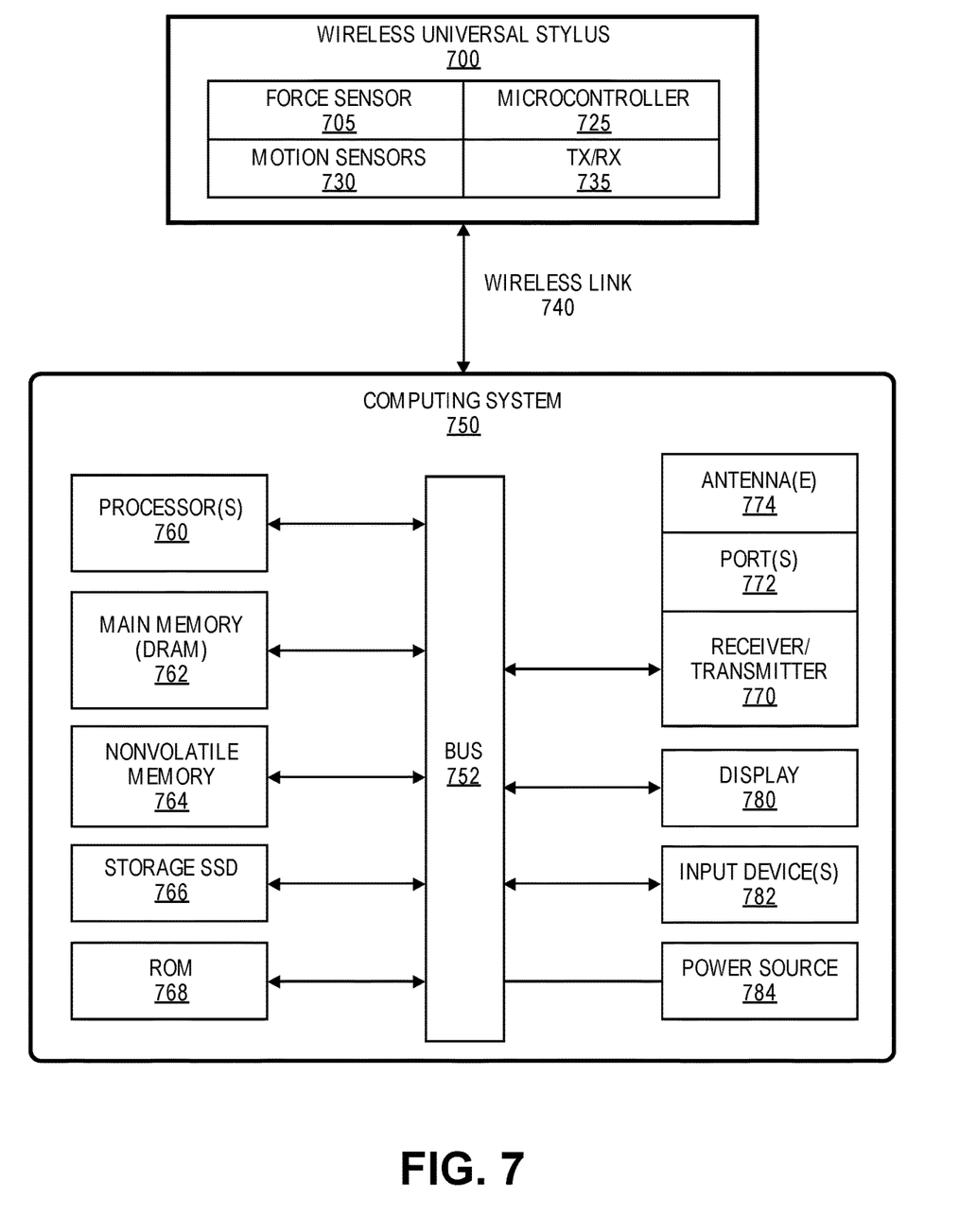
FIG. 7 is an illustration of an embodiment of a system including a universal wireless stylus and computing system according to an embodiment.

FIG. 7 is an illustration of an embodiment of a system including a universal wireless stylus and computing system according to an embodiment. In this illustration, certain standard and well-known components that are not germane to the present description are not shown. Elements shown as separate elements may be combined, including, for example, an SoC (System on Chip) combining multiple elements on a single chip.

In some embodiments, a system includes a wireless stylus 700, wherein the stylus 700 includes, but is not limited to, a force sensor 705 to sense force on the stylus, one or more motion sensors 730 to sense motion of the stylus, a microcontroller 725 to control operation of the stylus and to provide force and motion data, and a transmitter or transceiver 735 to transmit force data and motion data via a wireless link 740 to a computing system or apparatus 750. In some embodiments, the components of the universal stylus 700 include components illustrated in FIGS. 3 and 4.

In some embodiments, the computing system 750 may include a processing means such as one or more processors 760 coupled to one or more buses or interconnects, shown in general as bus 752. The processors 760 may comprise one or more physical processors and one or more logical processors. In some embodiments, the processors may include one or more general-purpose processors or special-processor processors. In some embodiments, the computing system 750 provides for gesture recognition based at least in part on the force data and motion data received from the stylus 700.

In some embodiments, the bus 752 is a communication means for transmission of data. The bus 752 is illustrated as a single bus for simplicity, but may represent multiple different interconnects or buses and the component connections to such interconnects or buses may vary. The bus 752 shown in FIG. 7 is an abstraction that represents any one or more separate physical buses, point-to-point connections, or both connected by appropriate bridges, adapters, or controllers.

In some embodiments, the computing system 750 further comprises a random access memory (RAM) or other dynamic storage device or element as a main memory 762 for storing information and instructions to be executed by the processors 760. Main memory 762 may include, but is not limited to, dynamic random access memory (DRAM).

The computing system 750 also may comprise a non-volatile memory 764; a storage device such as a solid state drive (SSD) 766; and a read only memory (ROM) 768 or other static storage device for storing static information and instructions for the processors 760.

In some embodiments, the computing system 750 includes one or more transmitters or receivers 770 coupled to the bus 752. In some embodiments, the computing system 750 may include one or more antennae 774, such as dipole or monopole antennae, for the transmission and reception of data via wireless communication using a wireless transmitter, receiver, or both, and one or more ports 772 for the transmission and reception of data via wired communications. Wireless communication includes, but is not limited to, Bluetooth™, Wi-Fi, near field communication, Ulolat (Ultra-Low Latency Wireless Connectivity), and other wireless communication standards.

In some embodiments, computing system 750 includes one or more input devices 782 for the input of data, including hard and soft buttons, a joy stick, a mouse or other pointing device, a keyboard, voice command system, or gesture recognition system. In some embodiments, the universal stylus 700 also operates as an input device to the computing system 750.

In some embodiments, the computing system 750 includes an output display 780, where the display 780 may include a liquid crystal display (LCD) or any other display technology, for displaying information or content to a user. In some environments, the display 780 may include a touchscreen that is also utilized as at least a part of an input device 782, wherein the universal stylus 700 may also operate as stylus with such touchscreen. Output display 780 may further include audio output, including one or more speakers, audio output jacks, or other audio, and other output to the user.

The computing system 750 may also comprise a battery or other power source 784, which may include a power adapter, a solar cell, a fuel cell, a charged capacitor, near field inductive coupling, or other system or device for providing or generating power in the computing system 750. The power provided by the power source 784 may be distributed as required to elements of the computing system 750.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, read-only memory (ROM), random access memory (RAM), erasable programmable read-only memory (EPROM), electrically-erasable programmable read-only memory (EEPROM), magnetic or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

In some embodiments, an apparatus includes a body; a microcontroller; a force sensor to detect a pressure applied against the body of the apparatus; one or more motion sensors; and a wireless transmitter and antenna, the microcontroller to transmit force data from the force sensor and motion data from the one or more motion sensors via the wireless transmitter and antenna.

In some embodiments, the apparatus is a handheld stylus for drawing or writing through space.

In some embodiments, the apparatus further includes a stylus tip for use of the apparatus as a stylus on a touchscreen.

In some embodiments, the force sensor surrounds a portion of the body of the apparatus.

In some embodiments, the apparatus further includes a grip covering the force sensor at least in part. In some embodiments, the grip is located in a portion of the apparatus to be gripped by one or more fingers of a user of the apparatus.

In some embodiments, the one or more motion sensors include one or more of an accelerometer and a gyro sensor. In some embodiments, the force sensor includes a force sensing resistor.

In some embodiments, apparatus is to concurrently generate the force data and the motion data.

In some embodiments, the body of the apparatus includes a cylindrical body portion.

In some embodiments, one or more non-transitory computer-readable storage mediums having stored thereon data representing sequences of instructions that, when executed by one or more processors, cause the one or more processors to perform operations comprising: wirelessly receiving force data and motion data from an apparatus, the force data representing a force applied against a body of the apparatus; tracking motion of the apparatus through space based at least in part on the motion data; displaying a line or shape on a display based at least in part on the motion data; and varying a characteristic of the line or shape based at least in part on a force level from the force data.

In some embodiments, the instructions further include comparing the force level from the force data to a force threshold; and upon determining that the force level is greater than or equal to the force threshold, transitioning to a first mode to start a stroke through space that is written or drawn with the apparatus.

In some embodiments, the instructions further include, upon determining that the force level is below the force threshold, transitioning to a second mode to end the stroke written or drawn through space with the apparatus.

In some embodiments, comparing the force level to a force threshold includes ignoring a change in the force level that has a duration of less than a certain time period.

In some embodiments, the characteristic is one of a width of the line or shape or a darkness of the line or shape.

In some embodiments, displaying the line or shape on a display based at least in part on the motion data includes performing gesture recognition based at least in part on the motion data.

In some embodiments, an apparatus includes means for wirelessly receiving force data and motion data from a second apparatus, the force data representing a force applied against a body of the second apparatus; means for tracking motion of the second apparatus through space based at least in part on the motion data; means for displaying a line or shape on a display based at least in part on the motion data; and means for varying a characteristic of the line or shape based at least in part on a force level from the force data.

In some embodiments, the apparatus further includes means for comparing the force level from the force data to a force threshold; and means for transitioning to a first mode to start a stroke that is written or drawn through space with the second apparatus upon determining that the force level is greater than or equal to the force threshold.

In some embodiments, the apparatus further includes means for transitioning to a second mode to end the stroke written or drawn through space with the second apparatus upon determining that the force level is below the force threshold.

In some embodiments, comparing the force level to a force threshold includes ignoring a change in the force level that has a duration of less than a certain time period.

In some embodiments, the characteristic is one of a width of the line or shape or a darkness of the line or shape.

In some embodiments, displaying the line or shape on a display based at least in part on the motion data includes performing gesture recognition based at least in part on the motion data.

In some embodiments, a system includes a wireless stylus including a body, a microcontroller, a force sensor to detect a force applied against the body of the stylus, one or more motion sensors, and a wireless transmitter and antenna, the microcontroller to transmit force data from the force sensor and motion data from the one or more motion sensors via the wireless transmitter and antenna; and a computing system including a processor to process the force data and the motion data, a wireless receiver and antenna to receive the force data and motion data from the stylus, and a display to display a line or shape written or drawn by the stylus through space, wherein the computing system is to generate the line or shape based at least in part on the motion data, wherein generating the line or shape includes varying a characteristic of the line or shape based at least in part on a force level from the force data.

In some embodiments, the computing system is further to compare the force level from the force data to a force threshold; and upon determining that the force level is greater than or equal to the force threshold, transition to a first mode to start a stroke that is written or drawn with the stylus through space.

In some embodiments, the computing system is further to, upon determining that the force level is below the force threshold, transition to a second mode to end the stroke written or drawn with the stylus through space.

In some embodiments, the characteristic is one of a width of the line or shape or a darkness of the line or shape.

In some embodiments, the force sensor is located along a circumference of the body of the stylus.

In some embodiments, the stylus further includes a grip covering the force sensor at least in part.

In some embodiments, the one or more motion sensors include one or more of an accelerometer and a gyro sensor. In some embodiments, the force sensor includes a force sensing resistor.

In some embodiments, the stylus is to concurrently generate the force data and the motion data.

What is claimed is:

1. An apparatus for use with an electronic device having a display screen, the apparatus comprising:
    a body;
    a microcontroller;
    a force sensor carried by the body;
    a grip covering at least a portion of the force sensor, the force sensor to generate force data in response to a user applying a force to the grip when the body is spaced apart from the display screen;
    one or more motion sensors;
    a wireless transmitter; and
    an antenna,
    the microcontroller to transmit the force data from the force sensor and motion data from the one or more motion sensors via the wireless transmitter and the antenna and, when the body is spaced apart from the display screen, to cause a first stroke having a first stroke property to be displayed on the display screen in response to the force data corresponding to a first force level and to cause a second stroke having a second stroke property to be displayed on the display screen in response to the force data corresponding to a second force level, the first stroke property different than the second stroke property.

2. The apparatus of claim 1, wherein the body includes a stylus tip.

3. The apparatus of claim 1, wherein the grip is accessible to one or more fingers of the user when the user is holding the body.

4. The apparatus of claim 1, wherein the one or more motion sensors include one or more of an accelerometer and a gyro sensor.

5. The apparatus of claim 1, wherein the force sensor includes a force sensing resistor.

6. The apparatus of claim 1, wherein the apparatus is to concurrently generate the force data and the motion data.

7. The apparatus of claim 1, wherein the body is cylindrical.

8. At least one non-transitory computer-readable storage medium comprising data representing sequences of instructions that, when executed by one or more processors, cause the one or more processors to:
    track motion of a stylus relative to a display screen of an electronic device in response to motion data received from the stylus when the stylus is spaced apart from the display screen;
    determine a force level of a grip of a user holding the stylus based on force data received from the stylus when the stylus is spaced apart from the display screen;
    cause a line or a shape to be displayed on the display screen in response to the tracking of the motion of the stylus;
    cause the line or the shape to have a first characteristic when the force level corresponds to a first force level; and
    cause the line or the shape to have a second characteristic when the force level corresponds to a second force level, the first characteristic different than the second characteristic.

9. The at least one non-transitory computer-readable storage medium of claim 8, wherein the instructions, when executed, are to cause the one or more processors to detect a first operational state of the stylus when the force level exceeds a force operation threshold, the first operational state corresponding to a writing mode of the stylus.

10. The at least one non-transitory computer-readable storage medium of claim 9, wherein the instructions, when executed, are to cause the one or more processors to detect a second operational state of the stylus when the force level is below the force operation threshold, the second operation state corresponding to a non-writing mode of the stylus.

11. The at least one non-transitory computer-readable storage medium of claim 10, wherein the instructions, when executed, are to cause the one or more processors to detect the second operation state when the force level is below the force operation threshold for a threshold duration of time.

12. The at least one non-transitory computer-readable storage medium of claim 8, wherein the first characteristic is one of a width of the line or the shape or a darkness of the line or the shape.

13. The at least one non-transitory computer-readable storage medium of claim 8, wherein the instructions, when executed, are to cause the one or more processors to recognize a gesture based at least in part on the motion data.

14. A system comprising:
    a wireless stylus; and
    a processor configured to:
        track motion of the wireless stylus relative to a display screen of an electronic device in response to motion data received from the wireless stylus when the wireless stylus is spaced apart from the display screen;
        determine a force level of a grip of a user holding the wireless stylus based on force data received from the wireless stylus when the wireless stylus is spaced apart from the display screen;
        cause a line or a shape to be displayed on the display screen based on the motion of the wireless stylus;
        cause the line or the shape to have a first characteristic when the force level corresponds to a first force level; and
        cause the line or the shape to have a second characteristic when the force level corresponds to a second force level, the first characteristic different than the second characteristic.

15. The system of claim 14, wherein the processor is configured to detect a first operational state of the wireless stylus when the force level exceeds a force operation threshold, the first operational state corresponding to a writing mode of the wireless stylus.

16. The system of claim 15, wherein the processor is further to detect a second operational state of the wireless stylus when the force level is below the force operation threshold, the second operational state corresponding to a non-writing mode of the wireless stylus.

17. The system of claim 14, wherein the first characteristic is one of a width of the line or the shape or a darkness of the line or the shape.

18. The system of claim 14, wherein the wireless stylus includes one or more of an accelerometer and a gyro sensor.

19. The system of claim 14, wherein the wireless stylus includes a force sensing resistor.

20. The system of claim 14, wherein the wireless stylus is to concurrently generate the force data and the motion data.

* * * * *